United States Patent [19]
Yunde et al.

[11] 3,745,245
[45] July 10, 1973

[54] HIGH RESOLUTION SYSTEM FOR T.V. MONITORING OF INTERMITTANT X-RAY SIGNALS

[75] Inventors: Yasufumi Yunde, Iruma-gun, Saitama-ken; Shigenobu Yanaka, Koto-ku, Tokyo; Kouichi Koike, Kashiwa-shi, all of Japan

[73] Assignee: Hitachi Roentgen Co., Ltd., Tokyo, Japan

[22] Filed: June 15, 1971

[21] Appl. No.: 153,333

[30] Foreign Application Priority Data

June 16, 1970 Japan ............................... 45/52084

[52] U.S. Cl. ............................. 178/6.8, 178/DIG. 5
[51] Int. Cl. ........................... H04n 5/32, H04n 7/18
[58] Field of Search .................... 178/6, 6.8, DIG. 1, 178/DIG. 3, DIG. 5, DIG. 22, 6.6 R, 6.6 A, 6.6 DD, 6.6 SF; 250/93, 53

[56] References Cited

UNITED STATES PATENTS

| | | | |
|---|---|---|---|
| 3,582,651 | 6/1971 | Siedband | 178/DIG. 5 |
| 3,401,299 | 9/1968 | Crowell | 178/DIG. 3 |
| 3,082,294 | 3/1963 | Dean | 178/6.8 |
| 3,085,130 | 4/1963 | Lemelson | 178/DIG. 22 |

*Primary Examiner*—Robert L. Richardson
*Attorney*—Craig, Antonelli & Hill

[57] ABSTRACT

A high resolution system to supplement intermittent image fields in X-ray television monitoring for diagnosis, in which X-rays are radiated intermittently for every one or several frames of television signals, a field of video signals obtained in each X-ray radiation is recorded, and a signal thus recorded is repeatedly reproduced to obtain, through a delay circuit, two pieces of the video signal with a phase difference of one half of a horizontal scanning period, so that, by combining these two pieces of the video signal and displaying them as a frame of images, an image of high resolution can be observed even during the periods of interruption of X-ray radiation.

10 Claims, 2 Drawing Figures

INVENTORS

YASUFUMI YUNDE,
SHIGENOBU YANAKA AND
KOUICHI KOIKE

BY Craig, Antonelli & Hill
ATTORNEYS

INVENTORS
YASUFUMI YUNDE,
SHIGENOBU YANAKA AND
KOUICHI KOIKE

BY Craig, Antonelli & Hill
ATTORNEYS

HIGH RESOLUTION SYSTEM FOR T.V. MONITORING OF INTERMITTANT X-RAY SIGNALS

BACKGROUND OF THE INVENTION

1. Field of the Invention

This invention relates to a system to supplement intermittent X-ray television video signals thereby to obtain a high resolution television picture from the intermittent signal.

2. Description of the Prior Art

The rate of X-ray dose on an examined patient in televised fluoroscopy is usually one to three R/min, depending on the fluoroscopic method, that is to say, on whether an X-ray image intensifier is used or not and the type of pickup tube employed. It is necessary, therefore, to take some measure to reduce the rate of X-ray dose on the patient as far as possible. This is true in catheterization which requires comparatively long time of fluoroscopy, in the stomach examination by X-ray which causes the genital gland to be exposed to radiation, and especially in a group screening of stomaches where most of the group members are considered in good health.

Raising the sensitivity of the X-ray television system to reduce the X-ray dose, however, deteriorates the image quality due to quantum noise, presenting a limitation on the practicability of the system.

In medial examination of a disease by use of X-rays, it is common to turn to the reading of an image on an X-ray film for a closer diagnosis. The X-ray fluoroscopy is used for examination of moving parts of the body and at the same time acts as a finder to determine the timing of spot-shot for the radiograph. The patient dose on the X-ray examination is almost derived from fluoroscopy rather than radiography.

In consideration of the fact that the purpose of fluoroscopy for determining the timing the radiograph is not to observe the rapid movement of body parts, the inventors have made an attempt to apply a pulsed X-ray by utilizing the vertical blanking periods at every one or several, frames of television signals, so that a field or frame of television signals thus obtained is recorded on a recording medium such as a magnetic disc, which picture is immediately read and reproduced, whereby observation is continued through the periods during which X-ray radiation is interrupted, thereby reducing the patient dose in the televised fluoroscopy by several tens of percentage or more from the present level. However, in a typical X-ray television system of the interlaced type, when the pulsed X-ray is produced in pulse form at all or several frames and the resultant video signal is recorded and reproduced in frame cycles, attenuation of the residual image on the photoconductive surface of the pickup tube causes the signal level of a second field image to decrease to 70 percent of that of a first field image immediately after X-ray radiation, so that the brightness of the picture reproduced is reduced to 50 percent or less, causing the picture to flicker. On the other hand, increasing the brightness of the picture results in a reduced resolution thereof and if only one field of image immediately after each X-ray radiation is recorded and reproduced, the number of scanning lines is reduced to a half and thereby the resolution of the image further deteriorates.

SUMMARY OF THE INVENTION

This invention overcomes the above-mentioned problems and provides a system to supplement intermittent X-ray television image fields whereby a high resolution television picture is obtained, while at the same time reducing the patient dose during the televised fluoroscopy.

DESCRIPTION OF THE PREFERRED EMBODIMENT

Figure 1:
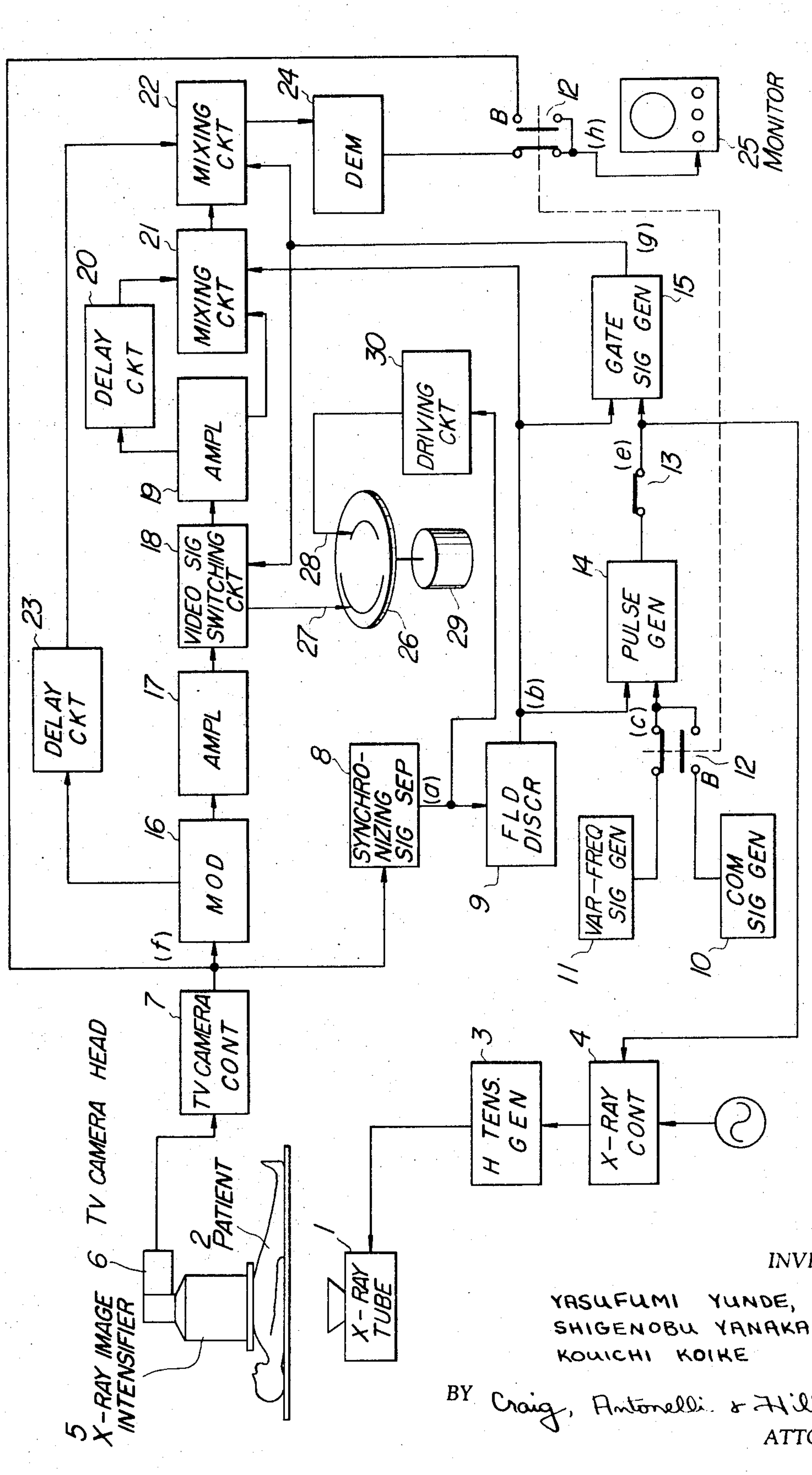
FIG. 1 is a block diagram showing an embodiment of this invention.

An embodiment of the invention will now be explained with reference to the accompanying drawings. In FIG. 1, the reference numeral 1 shows an X-ray tube, numeral 2 a patient, numeral 3 a high-tension generator, and numeral 4 an X-ray control. These component elements 1, 3 and 4 combine to radiate pulsed X-rays either by a well-known method using a grid controlled X-ray tube or by a method in which a high voltage in pulse form from the high voltage source is applied between the electrodes of a diode X-ray tube. The reference numeral 5 shows an X-ray image intensifier, numeral 6 a television camera head, and numeral 7 a television camera control which incorporates a video amplifier and a synchronizing signal generator. Numeral 8 shows a synchronizing signal separator, numeral 9 a field discriminator for identifying odd or even-numbered fields, numeral 10 a command signal generator in order to successively radiate pulsed X-rays at every field, and numeral 11 a variable-frequency signal generator which generates a command signal for radiating intermittent pulse-like X-rays at a frequency lower than the standard frame number in a television system. Numeral 12 shows a switch for switching between the signals from both the signal generators 10 and 11 depending on whether X-rays are radiated continuously at every field or intermittently. Numeral 13 shows a switch for observing a still image instantaneously during a televised fluoroscopy. Numeral 14 shows a pulse generator for X-ray triggering which is synchronised with a signal relating to the field scanning by means of the field discriminator 9 and the signal generator 10 or 11. Numeral 15 shows a gate signal generator which is energized by an output of the field discriminator and the pulse generator 14. Numeral 16 shows a modulator for converting a video signal into a signal suited for magnetic recording. Numeral 17 shows an amplifier for amplifying the modulated signal up to a level where it is recorded on a magnetic disc. Numeral 18 shows a video signal switching circuit which causes a video signal from the amplifier 17 to be written into the magnetic disc in response to a gate signal from the gate signal generator 15 and transmits a video signal read from the magnetic disc to an amplifier 19. Numeral 19 shows the amplifier for amplifying the signal read out to a desired level. Numeral 20 shows a delay circuit for delaying the video signal read out of the magnetic disc by one half of a horizontal scanning period. Numerals 21 and 22 show mixing circuits, the former being provided for alternating between the video signal from a magnetic head and the video signal delayed through the delay circuit 20 and mixing them to produce a continuous video signal, while the latter being provided for the purpose of mixing an output of the mixing circuit 21 and a field of video signals obtained by scanning the target surface of the pickup tube immediately after each X-ray radiation thereby producing an unintermittent video signal. Numeral 23 shows a delay circuit for removing the time lag between the above-mentioned video signal obtained by scanning the target surface of the pickup tube and the video signal read out by the magnetic head. Numeral 24 shows a demodulator, numeral 25 a monitor for observation, and numeral 26 the magnetic disc which makes one rotation for every field. Numerals 27 and 28 show magnetic heads, the former for writing and reading a video signal and the latter for reading a timing pulse which was written into the magnetic disc in advance in order to control the rotational phase of the magnetic disc 26. Numeral 29 shows a synchronous motor for driving the magnetic disc 26 and numeral 30 a driving circuit for the synchronous motor 29.

Figure 2:
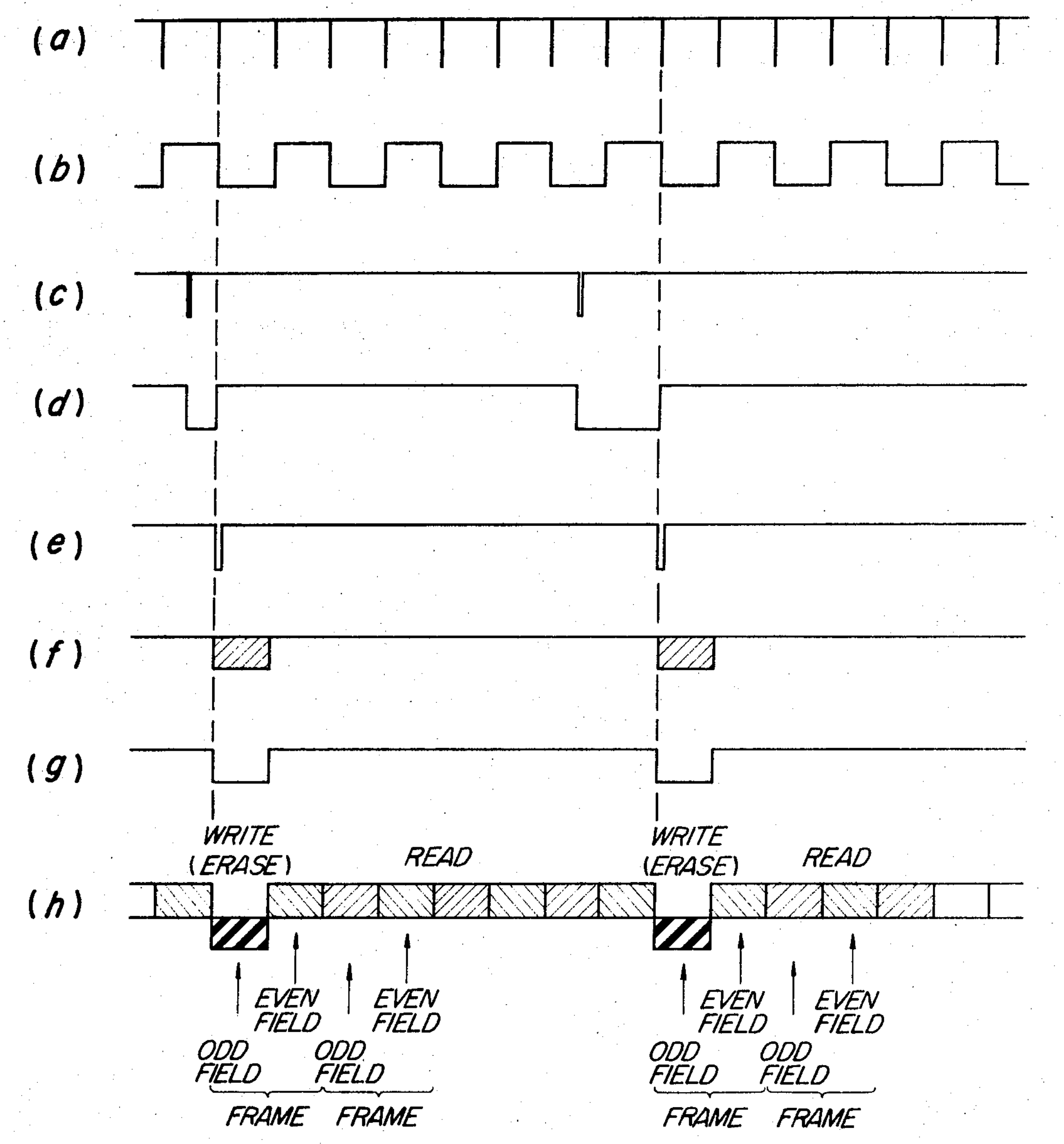
FIG. 2 is a time chart showing the operation of the apparatus according to this invention.

The operation of the apparatus according to the present invention will be now explained with reference to FIGS. 1 and 2. The field synchronizing signal (a) separated by the synchronizing signal separator from the composite video signal from the television camera control 7 is converted into a rectangular wave (b) with a flip-flop in the field discriminator 9. This signal with a rectangular waveform alternates between positive and negative levels in the odd or even fields, so that it is used as a gate signal for the mixing circuit 21 which switches alternately between the signal through the delay circuit 20 and the one direct from the amplifier 19, both from the magnetic head 27, at each field, thereby to produce a high resolution picture as if an interlaced scanning is effected.

Assuming now that a write command signal (c) of a given frequency lower than the standard frame number of a television system is applied to the pulse generator 14 in an even field, an X-ray trigger pulse (e) is generated by means of the timing pulse (d) immediately before the next following odd field is starting to be scanned, so that a pulsed X-ray is radiated during a blanking period. Accordingly, a video signal corresponding to an odd field as shown by (f) is transmitted from the television camera to the video signal switching circuit 18 and the mixing circuit 22. Under this condition, the X-ray trigger pulse (e) and the gate signal (g) from the gate signal generator 15 due to the output signal (b) of the field discriminator 9 are applied to the video signal switching circuit 18 and the mixing circuit 22, so that the gate signal (g) energizes the signal switching circuit 18, whereby the video signal corresponding to the odd field, which is generated by X-ray radiation, is written into the magnetic disc 26 from the magnetic head 27. At this time, the signal which had already been written in the magnetic disc 26 is erased by the video signal newly written in.

The gate signal (g) also energizes the mixing circuit 22 so that the signal supplied through the delay circuit 23 from the modulator 16 is passed to the demodulator 24 only during the writing operation. The magnetic disc 26 rotates in synchronism with the field frequency in such a manner that a field of video signals is written in it at every rotation thereof. The magnetic head 27 reads video signals previously written in the magnetic disc 26, except the one corresponding to the field immediately after the X-ray radiation. In other words, after the video signal corresponding to the field immediately following X-ray radiation — this is an odd field as is evident from the above description— is written during the first rotation, it is read by the magnetic head 27 as video signals alternating between even and odd fields from the second rotation until a video signal due to the next X-ray radiation is written in, thereby producing an uninterrupted frame. An input video signal to the monitor 25 due to the above-mentioned writing and reading operations is indicated by (h).

Of the video signals read by the magnetic head as described above, video signals corresponding to even fields are delayed through the delay circuit 20 by one half of a horizontal scanning period and mixed with video signals supplied from the delay circuit 23 by means of the mixing circuit 22, so that both signals are applied to the observation monitor 25 in succession with the result that the same images as if from interlaced scanning are effected and are displayed on the monitor 25, thereby making it possible to prevent reduced resolution which otherwise might occur due to the reduction in the scanning lines, while at the same time preventing undesirable flickering.

The magnetic head 28 is provided for the purpose of reading timing pulses which are written in the magnetic disc, and the driving circuit 30 compares the signal from the magnetic head 28 with a field synchronizing signal from the synchronizing signal separator 8 in such a way that the rotational speed and phase of the magnetic disc are always in synchronism with the television system.

When the switch 12 is closed at the B side, pulsed X-rays are radiated successively at every field so as to enable ordinary televised fluoroscopy not through the recording system. On the other hand, when the switch 13 is opened during fluoroscopy by radiation of X-rays in the form of intermittent or continuous pulses, an X-ray radiation command signal to the X-ray control and a write command signal to the vodeo signal switching circuit 18 and the mixing circuit 22 are cut off. As a result, the intermittent or continuous pulsed X-ray is stopped, whereupon a still image due to a video signal written in the magnetic disc can be observed on the monitor 25.

A field synchronizing signal from the television camera control 7 may be utilized as a write command signal ignoring a signal corresponding to alternate fields, but, as shown in the above-described embodiment, an oscillator with variable frequencies may be employed to better advantage since the frequency of X-ray pulse can be changed at will in accordance with the parts of a human body to be fluoroscoped and the purposes for the examination.

The recording medium for video recording is not limited to the magnetic disc but may comprise a magnetic sheet, magnetic tape, magnetic drum, delay line or a storage tube of the electronic recording type. Also, the signal written in the magnetic disc may be erased with the aid of a separate erasing signal or separate erasing head, instead of by means of the written signal itself as in the above-described embodiment.

It will be seen from the above-description that, according to this invention, a field of video signals obtained by scanning, immediately after each X-ray radiation, is written in a recording medium, which signals are read and immediately reproduced at every field until another signal is written in at the time of the next X-ray radiation. The reproduced signal is passed through a delay circuit to obtain two pieces of the video signals with a phase difference of one half of a horizontal scanning period. These two pieces of the video signal are switched alternately and mixed with each other at each field, so that they are applied to the monitor 25 as a continuous video signal. Consequently, uninterrupted television images with high resolution are observed on the monitor 25 even when the X-ray radiation is interrupted.

We claim:

1. A system for displaying a television picture from intermittent X-ray images obtained from intermittent X-ray radiations, said system comprising:

first means for projecting intermittent X-ray radiations onto a subject at a predetermined frequency to produce intermittent X-ray images;

second means for scanning each of said intermittent X-ray images thereby producing a video signal of each X-ray image corresponding to one field of a television picture to be displayed;

third means for storing a video signal including a recording medium and means for erasing a previously recorded signal on said recording medium and recording said video signal produced by said second means on said recording medium;

fourth means for reading out said video signal recorded on said third means repeatingly at a frequency corresponding to the field frequency of said television picture, thereby producing a train of identical video signals each being the same as said video signal produced by said second means;

fifth means for delaying every other one of said video signals produced by said fourth means by a predetermined time and producing a train of delayed and non-delayed alternately occurring video signals; and sixth means for receiving said video signal produced by said second means and said delayed and non-delayed video signals produced by said fifth means and applying every adjacent two of said received video signals, one of which is non-delayed and the other is delayed, to a monitor, sequentially, thereby displaying on said monitor a television picture, said every adjacent two video signals covering a frame of said television picture.

2. A system according to claim 1, wherein said fifth means comprises means for delaying every other one of said video signals produced by said fourth means by one half of a period for scanning one horizontal line of said television picture.

3. A system according to claim 2, further comprising means for interrupting said intermittent X-ray radiations of said first means and for causing said fourth means to produce a train of identical video signals each being the same as the one produced by scanning the X-ray image produced by said first means just before the interruption of said X-ray radiations, thereby displacing a still television picture of said last-mentioned X-ray image.

4. A system according to claim 3, wherein said intermittent X-ray radiations are projected each during one of the blanking periods in a television signal for displaying the television picture.

5. A system according to claim 1, further comprising means for interrupting said intermittent X-ray radiations of said first means and for causing said fourth means to produce a train of identical video signals each being the same as the one produced by scanning the X-ray image produced by said first means just before the interruption of said X-ray radiations, thereby displaying a still television picture of said last-mentioned X-ray image.

6. A system according to claim 1, wherein said third means comprises a magnetic disc serving as the recording medium, and driving means for rotating said magnetic disc at a speed corresponding to the field frequency of said television picture.

7. A system according to claim 1, wherein said intermittent X-ray radiations are projected each during one of the blanking periods in a television signal for displaying the television picture.

8. A system according to claim 1, further comprising means for controlling the operation of said fourth and sixth means including a pulse generator circuit, responsive to the video signal produced by said second means and a preselected frequency signal for generating a first control pulse and a gate signal generator, responsive to said first control pulse and to the contents of said video signal for selectively gating said fourth and sixth means.

9. A system according to claim 8, further including a field discriminator means, responsive to the video signal output of said second means, for generating a rectangular signal the respective levels of which correspond to the alternate fields making up said video signal, the output of said field discriminator means being connected to said pulse generator circuit, said gate signal generator, and said fifth means.

10. A system according to claim 9, further including switch means, connected between said pulse generator circuit, said gate signal generator and said first means, for switchably effecting the observation of a still image instantaneously during the production of television X-ray pictures.

* * * * *